United States Patent [19]
Lin

[11] Patent Number: 6,053,589
[45] Date of Patent: Apr. 25, 2000

[54] AUTOMATIC INCLINATION DEVICE FOR A PORTABLE COMPUTER

[75] Inventor: Jing-Jye Lin, Taipei, Taiwan

[73] Assignee: Inventec Corp., Taipei, Taiwan

[21] Appl. No.: 09/151,381

[22] Filed: Sep. 10, 1998

[51] Int. Cl.[7] ...................................... H05K 7/00
[52] U.S. Cl. .................... 312/271; 403/688; 403/685; 403/923; 361/683; 361/679
[58] Field of Search ..................... 220/241, 324; 312/271; 403/688, 685, 923; 361/679, 683, 681

[56] References Cited

U.S. PATENT DOCUMENTS

| | | | |
|---|---|---|---|
| 4,915,275 | 4/1990 | Brown | 248/688 X |
| 5,260,885 | 11/1993 | Ma | 364/708.1 |
| 5,347,424 | 9/1994 | Akahane | 248/688 X |
| 5,469,327 | 11/1995 | Cheng | 248/688 X |
| 5,594,617 | 1/1997 | Foster et al. | 361/679 |
| 5,737,183 | 4/1998 | Kobayashi et al. | 248/685 X |
| 5,771,152 | 6/1998 | Crompton et al. | 248/923 X |
| 5,873,632 | 2/1999 | Chieh-Tsung | 297/404 |

*Primary Examiner*—Peter M. Cuomo
*Assistant Examiner*—Stephen Vu
*Attorney, Agent, or Firm*—W. Wayne Liauh

[57] ABSTRACT

An automatic inclination device for a portable or notebook computer. It includes: (a) a base, on which an operation board is mounted; (b) a cover, pivotally connecting on an axis to a portion of the base; (c) a driving element, which is fixed to the cover and is coaxial with the axis, such that the driving element rotates when the cover is pivotally opened or closed; and (d) a driven element, engaged with the driving element to move therewith. The driven element is structured to move a stand to either come out from a cavity formed under the base near the pivotal portion so as to cause an associated portion of the base to rise up and the operation board to be in an inclined position, or retrieve into the cavity when the cover is opened and closed, respectively. In a preferred embodiment, the driving element is a ring gear the driven is a rack gear, and the stand is an extension of the rack gear.

14 Claims, 5 Drawing Sheets

AUTOMATIC INCLINATION DEVICE FOR A PORTABLE COMPUTER

BACKGROUND OF THE INVENTION

The present invention relates to a device for adjusting the inclination of an operation board in a portable computer, and, more particularly to a device applied in a portable or a notebook computer which will automatically tilt the operation board in the computer to a suitable angle when an user opens up the cover or the display screen.

Current input devices for computer peripherals, such as keyboards and mouses, are generally designed to be comfortable and human-engineered in order to prevent harms or burdens to the human body. Unfortunately, for common portable or notebook computers, due to the demands for light-weight, compact, high speed and high capacities, the comfort of the keyboard is not as good as those of the desktop computers. A prior improvement for solving this problem, as shown in FIG. 1, is to provide two simple foldable stands under the base of a portable computer. The stands have to be manually lifted by the user for inclining the keyboard with an angle of an easier operation, and bent down to their storage positions after use. Though there is further a kind of separated keyboard with inclination stands, the user still has to handle the stands respectively. It is bothersome and unstable because if any of the stands is not well positioned, the keyboard during the use might suddenly collapse which might cause damages or malfunction in the computer.

SUMMARY OF THE INVENTION

It is therefore a primary object of the present invention to solve the aforesaid problem and provide a device for adjusting the inclination of an operation board of a portable computer. The device will automatically tilt the operation board of the computer to a suitable angle when an user opens the cover or the display of the computer to a working angle.

To achieve the aforesaid object, a device according to the present invention includes a driving element which is fixed to a cover of the computer and rotates together with the cover; a driven element which is engaged with the driving element, and a stand movable from a cavity under a base of the computer. When the cover is opened by the user, the driving element drives the driven element and moves the stand out of the cavity, and thus an operation board, generally called the keyboard, will be tilted to a desired angle for an easier use. In this way, the inclination of the operation board is automatically set up or retrieved at the same time when turning the cover to a working angle or when closing it. It is so easier and more convenient to be handled.

The features and advantages of the present invention will be described or will become apparent from the following more detailed description of preferred embodiments.

BRIEF DESCRIPTION OF THE DRAWINGS

With reference to the accompanying drawings.

DETAILED DESCRIPTION OF PREFERRED EMBODIMENTS

Figure 1:
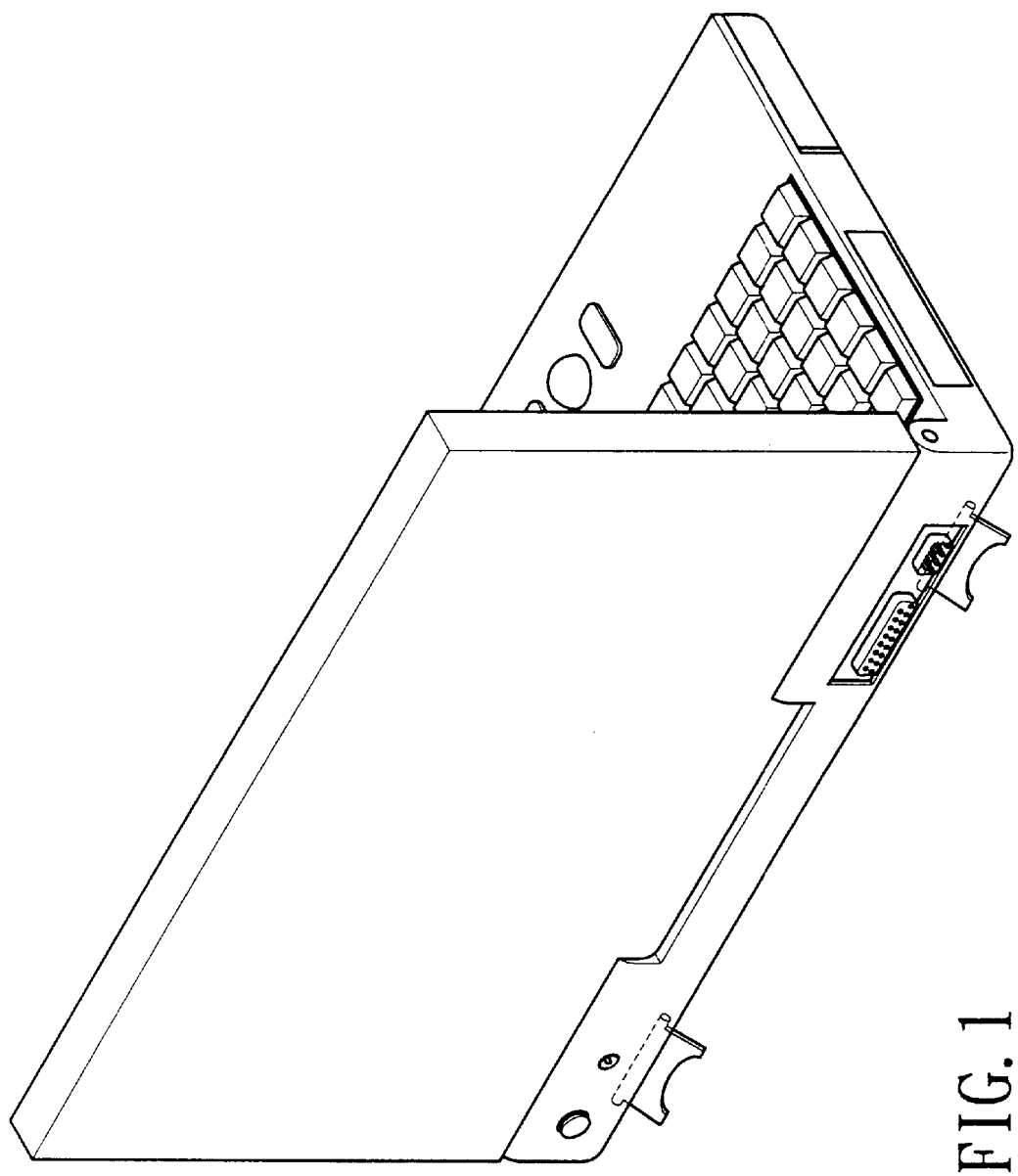
FIG. 1 shows a conventional stand device for a portable computer.

A conventional stand device for a portable computer is shown in FIG. 1 which is bothersome and unstable as described above.

Figure 2:
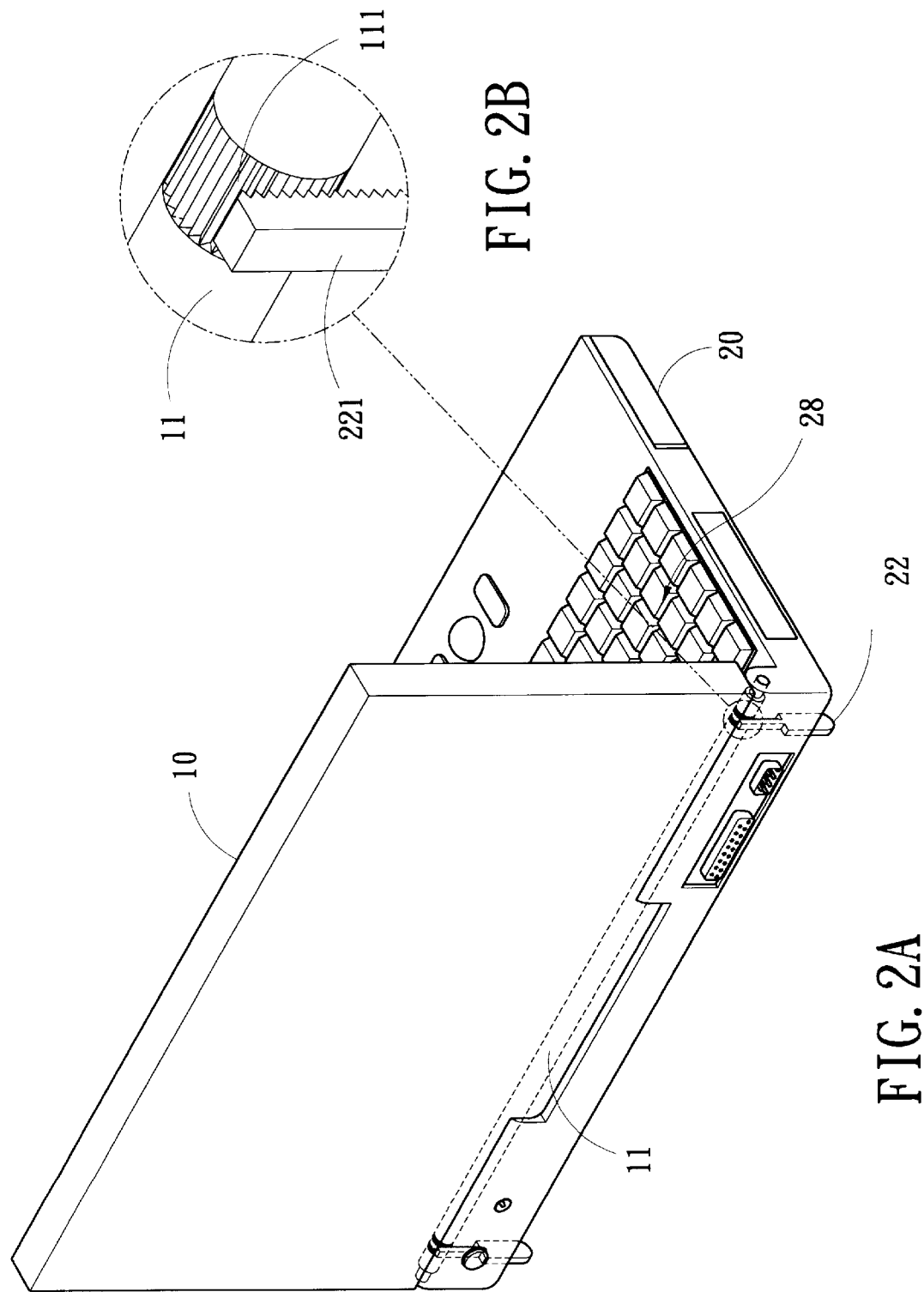
FIGS. 2A and 2B are perspective views of a first embodiment of the present invention.
Figure 3:
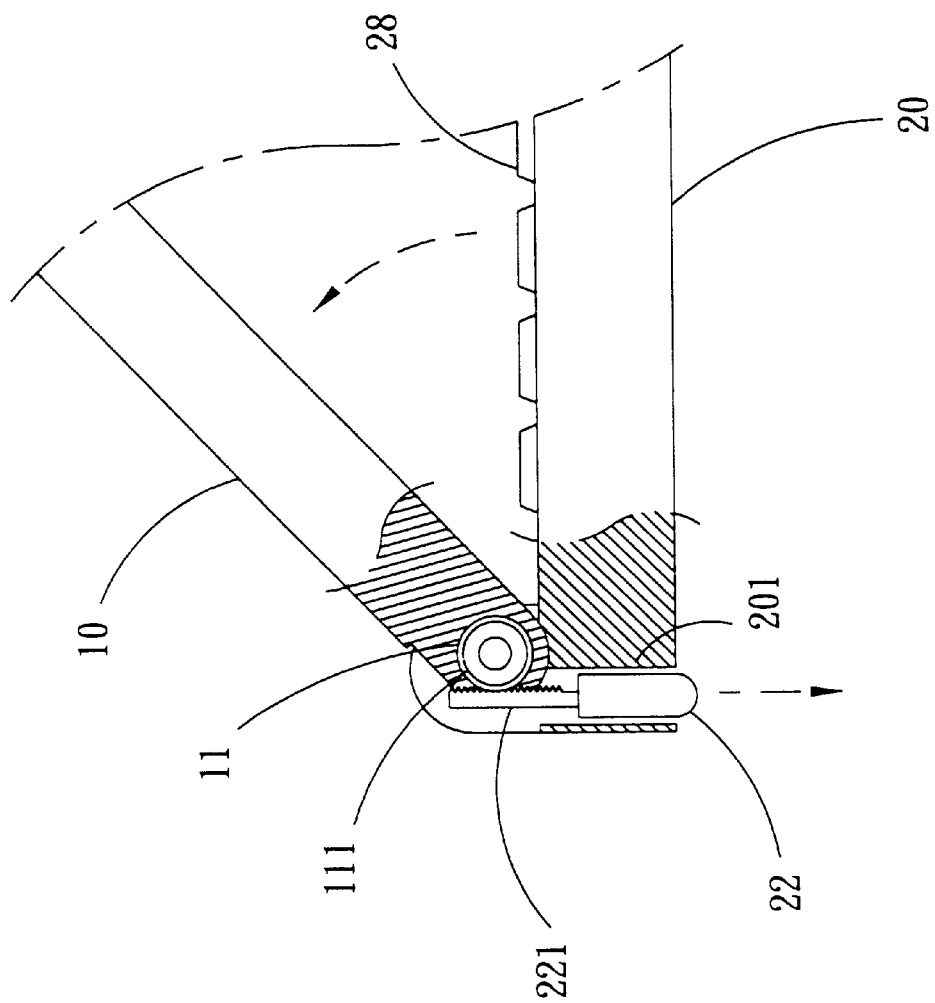
FIG. 3 is a partial cross-section view of the first embodiment of the present invention.

FIGS. 2A and 2B are perspective views of a first embodiment of the present invention. In a portable computer, there is a pivot 11 for rotationally connecting a cover 10 to a base 20. Two gears 111 are furnished on two portions of the pivot 11 respectively. Each gear respectively connects with a rack 221 furnished on a stand 22. Also referring to FIG. 3, the racks 221 are driven by the gears 111 to extrude the stands 22 gradually out of two cavities 201 under the base 20 when the user moves the cover (the display) 10 to a working angle, and therefore, inclines the operation board (the keyboard) 28 to a suitable angle for a more comfortable operation. On the contrary, when the user closes down the cover 10, the pivot 11 will rotate the gears 111 which will then drive the racks 221 upwards to retrieve the stands 22 into the cavities 201 at the same time. The gear ratio between the gears 111 and the racks 221 of the stands 22 are so designed to obtain a comfortable operation angle for the operation board 20 relative to the working angle of the cover 10.

Figures 4A, 4B:
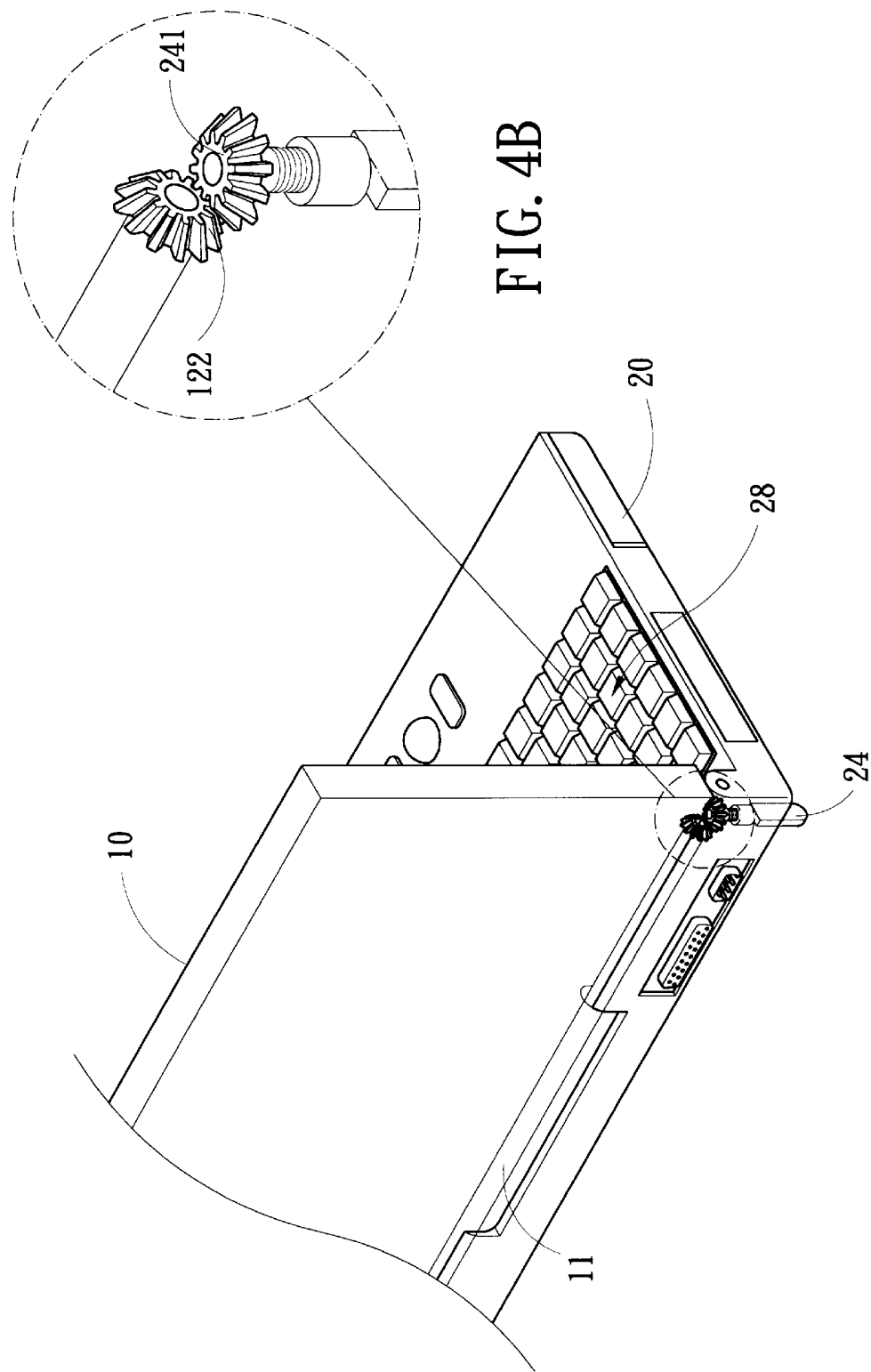
FIGS. 4A and 4B are perspective views of a second embodiment of the present invention.

Referring now to FIGS. 4A and 4B, are perspective views of a second embodiment of the present invention is shown. Two pair of bevel gears 122 and 241 are used to replace the gears 111 and racks 221 of the aforesaid first embodiment respectively. The driving bevel gears 122 furnished on the pivot 11 drive the driven bevel gears 241 to rotate and further drive two stands 24 through a screw means. So that, the stands 24 will be gradually moved out from two cavities under the base 20 when the user moves the cover (the display) 10 to a working angle, and therefore, incline the operation board 28 to a suitable angle for a more comfortable operation. On the contrary, when the user closes down the cover 10, the pivot 11 will rotate the driving bevel gears 122 which will then drive the driven bevel gears 241 and the screws formed between the driven bevel gears 241 and the stands 24 to retrieve the stands 24 into the cavities at the same time. The gear ratio between the bevel gears 122, 241 and the screws are so designed to obtain a comfortable operation angle of the operation board 20 relative to the working angle of cover 10.

Figure 5:
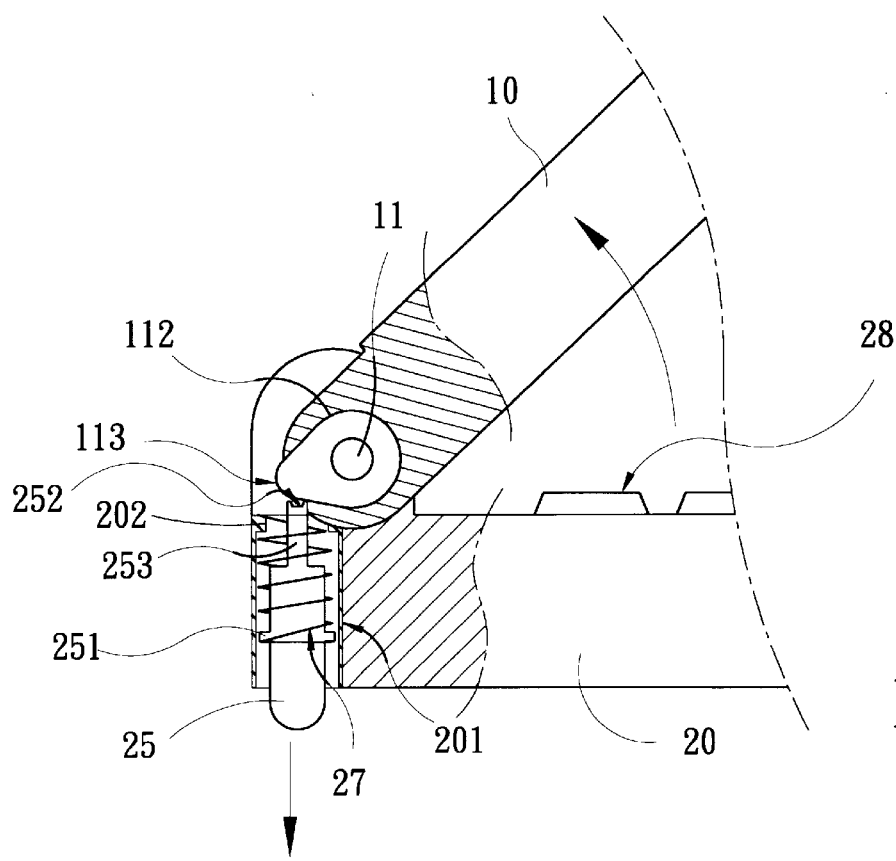
FIG. 5 is a partial cross-section view of a third embodiment of the present invention.

Referring now to FIG. 5, a partial cross-section view of a third embodiment of the present invention is shown. Two pair of cam mechanisms 112 are used to replace the gears 111 and racks 22 of the aforesaid first embodiment. Two driving cams 112 furnished on the pivot 11 drive two driven rods 253 and also the two stands 25 gradually moving out of the two cavities 201 under the base 20 when the user moves the cover (the display) 10 to a working angle. Each of the two stand mechanisms 25 includes respectively a tension spring 27 fixed with its upper end on a portion 202 of the cavity 201 and its lower end on a portion 251 of the stand 25. The spring 27 always draws the stand 25 upwards to make the rod 253 be in touch with the cam 112. There is a concavity 252 formed on the top end of the rod 253 so that as the cams 112 are moved along with the pivot 11 when the cover 10 is tilted by the user, the cams 112 will press the rods 253 and the stands 25 down until a dead end 113 of the cam 112 rests on the concavity 252 of the rod 253 to incline the operation board 28 to a suitable angle for a more comfortable operation. On the contrary, when the user closes the cover 10, the rods 253, in other words, the stands 25 will be retrieved into the cavities 201 at the same time.

Figure 6:
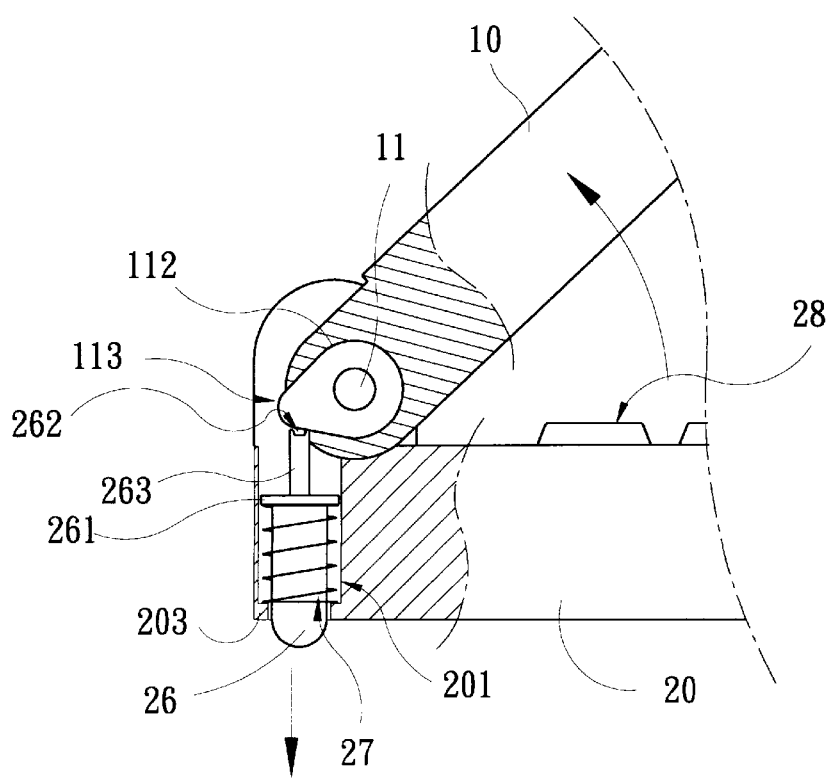
FIG. 6 is a partial cross-section view of a fourth embodiment of the present invention.

Further referring to FIG. 6, a partial cross-section view of a fourth embodiment of the present invention is shown. The tension springs 27 illustrated in FIG. 5 are replaced with two compression springs 27. Each of the springs is loaded with its upper end on a portion 261 of a stand 26 and its lower end on a portion 203 of a cavity 201 furnished under the base 20. The spring 27 always lifts the stand 25 upwards to make a rod 263 be in touch with the cam 112. There is a concavity 262 formed on the top end of the rod 263 so that as the cams 112 are moved along with the pivot 11 when the cover 10 is tilted by the user, the cams 112 will press the rods 263 and the stands 26 down until the dead end 113 of the cam 112 rests on the concavity 262 of the rod 263 to incline the operation board 28 to a suitable angle for a more comfortable operation. On the contrary, when the user closes the cover 10, the rods 263, in other words, the stands 26 will be retried into the cavities 201 at the same time.

Although the invention has been described in connection with preferred embodiments, it will be understood by those skilled in the art that various changes may be made without departing from its scope.

What is claimed is:

1. An automatic inclination device for an operation board of a portable computer, comprising:
   a base, on which the operation board is mounted;
   a cover, pivotally connecting on an axis to a portion of the base;
   at least a driving element, which is fixed to the cover and is coaxial with the axis, such that the driving element rotates when the cover is pivotally opened or closed; and
   at least a driven element, engaged with the driving element to move therewith, the driven element being structured to move a stand to either (a) come out from a cavity formed under the base near the pivotal portion so as to cause an associated portion of the base to rise up and the operation board to be in an inclined position, or (b) retrieve into the cavity when the cover is opened or closed, respectively.

2. The automatic inclination device for an operation board of a portable computer according to claim 1 wherein the driving element is a gear.

3. The automatic inclination device for an operation board of a portable computer according to claim 2 wherein the driven element is a rack engaged with the gear.

4. The automatic inclination device for an operation board of a portable computer according to claim 3 wherein the rack and the gear are engaged in a suitable gear ratio for providing a suitable inclination of the base relative to a pivotal angle of the cover.

5. The automatic inclination device for an operation board of a portable computer according to claim 1 wherein the driving element is a driven bevel gear.

6. The automatic inclination device for an operation board of a portable computer according to claim 5 wherein the driven element is a driven bevel gear engaged with the driving bevel gear.

7. The automatic inclination device for an operation board of a portable computer according to claim 6 wherein the driven bevel gear is further engaged with the stand by a screw means.

8. The automatic inclination device for an operation board of a portable computer according to claim 6 wherein the driving and the driven bevel gears are engaged in a suitable gear ratio for providing a suitable inclination of the base relative to a pivotal angle of the cover.

9. The automatic inclination device for an operation board of a portable computer according to claim 1 wherein the driving element is a cam.

10. The automatic inclination device for an operation board of a portable computer according to claim 9 wherein the driven element is a rod connected to the stand and kept in contact with the cam by a force provided by a spring mounted in the cavity.

11. The automatic inclination device for an operation board of a portable computer according to claim 10 wherein the cam and the rod are formed with a dead end and a concavity respectively for providing a suitable inclination of the base relative to a pivotal angle of the cover.

12. The automatic inclination device for an operation board of a portable computer according to claim 10 wherein the spring is a tension spring connecting the rod and the cavity for normally retrieving the rod and the stand into the cavity.

13. The automatic inclination device for an operation board of a portable computer according to claim 10 wherein the spring is a compression spring connecting the rod and the cavity for normally retrieving the rod and the stand into the cavity.

14. The automatic inclination device for an operation board of a portable computer according to claim 1 wherein the driving element is a ring gear, the driven element is a rack gear, and the stand is an extension of the rack gear;
   whereby, when the cover is opened up, the driving element is caused to rotate, and the rotation of the driving element, through its engagement with the driven element, causes the stand to move downward and the associated portion of the base to rise, so as to cause the operation board to be in an inclined position
   and when the cover is closed, the rotation of the driving element in an opposite direction, through its engagement with the driven element, causes the stand to move upward and the associated portion of the base to descend, so as to cause the operation board to be in an uninclined position.

* * * * *